United States Patent [19]

Herscovici

[11] 4,281,560
[45] Aug. 4, 1981

[54] SPEED REDUCER GEAR BOX WITH FLYWHEEL

[75] Inventor: Saul Herscovici, Waterloo, Iowa

[73] Assignee: Power Engineering and Manufacturing, Ltd., Waterloo, Iowa

[21] Appl. No.: 117,005

[22] Filed: Jan. 30, 1980

Related U.S. Application Data

[63] Continuation of Ser. No. 883,199, Mar. 3, 1980, abandoned.

[51] Int. Cl.³ .............................................. F16H 1/20
[52] U.S. Cl. ................................... 74/414; 74/421 R; 74/572
[58] Field of Search ................. 74/414, 416, 417, 420, 74/421 R, 421 A, 412 R, 572

[56] References Cited

U.S. PATENT DOCUMENTS

| 1,185,197 | 5/1916 | Hartford | 74/421 R |
|---|---|---|---|
| 1,604,401 | 10/1926 | Fisher | 74/421 R |
| 2,039,845 | 5/1936 | Howland-Shearman | 74/572 |
| 2,878,909 | 3/1959 | Munschauer | 74/421 R |
| 3,398,597 | 8/1968 | Chung | 74/421 R |
| 3,590,652 | 7/1971 | Strang | 74/421 R |
| 4,116,084 | 9/1978 | Masuda | 74/412 R |
| 4,124,327 | 11/1978 | Yoshida et al. | 74/572 |

FOREIGN PATENT DOCUMENTS

| 2324122 | 11/1974 | Fed. Rep. of Germany | 74/421 R |
|---|---|---|---|
| 743071 | 1/1933 | France | 74/572 |
| 816003 | 4/1937 | France | 74/414 |

Primary Examiner—Lawrence J. Staab
Attorney, Agent, or Firm—Zarley, McKee, Thomte, Voorhees & Sease

[57] ABSTRACT

A speed reducer gear box comprising input, intermediate and output shafts rotatably mounted in a gear case. A hydraulic motor or the like is connected to the input shaft and is adapted to rotate the same. The intermediate shaft has a helical gear mounted thereon which is in mesh with a gear tooth portion on the input shaft whereby rotation of the input shaft by the hydraulic motor causes rotation of the intermediate shaft. A helical gear is also mounted on the output shaft for rotation therewith and is in mesh with a gear tooth portion on the intermediate shaft. A flywheel is mounted on the input shaft for rotation therewith to provide inertia to stabilize and to smooth out the operation of the gear box.

3 Claims, 2 Drawing Figures

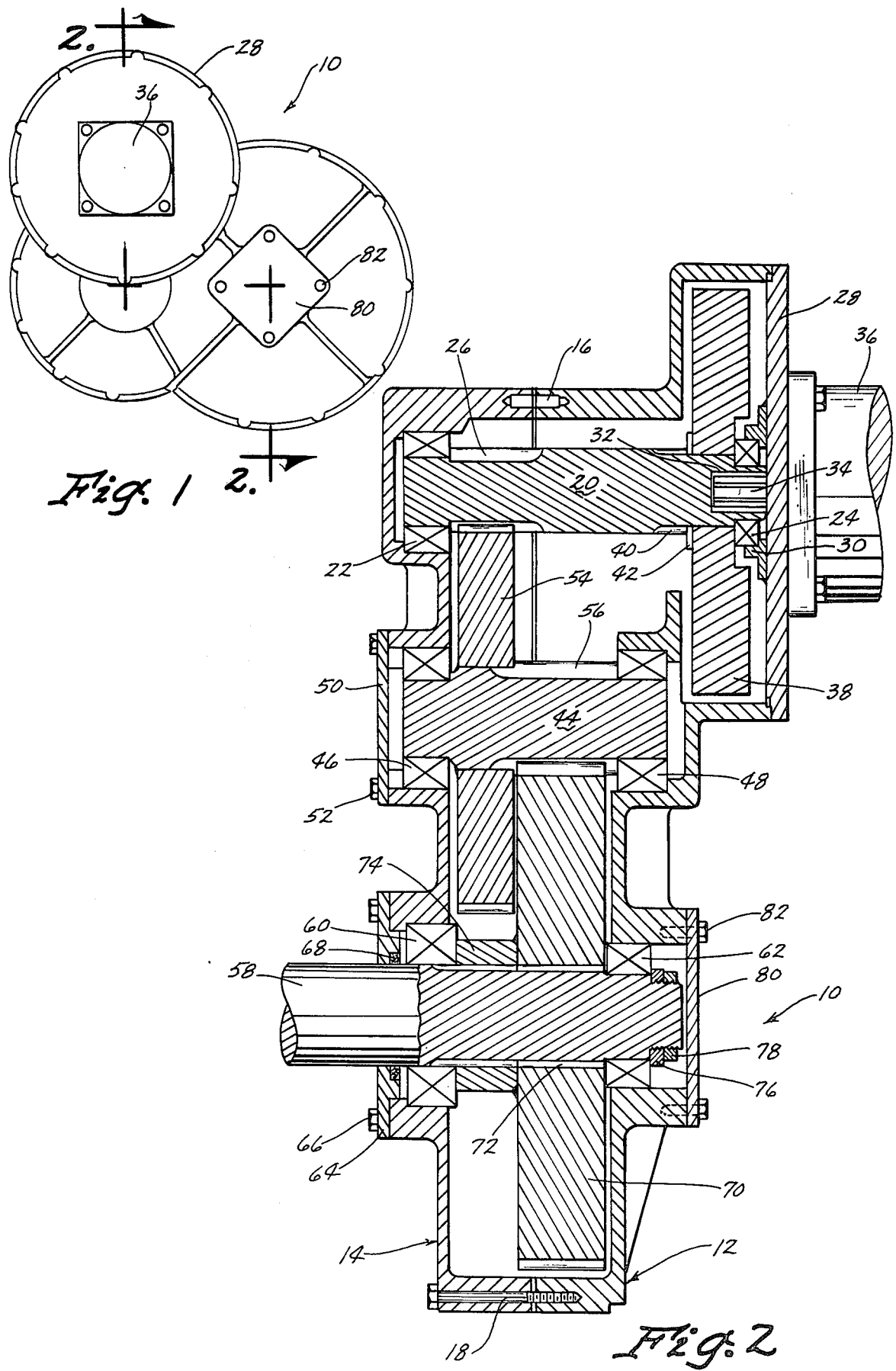

SPEED REDUCER GEAR BOX WITH FLYWHEEL

This application is a continuation of Ser. No. 883,199, filed Mar. 3, 1980, and now abandoned.

BACKGROUND OF THE INVENTION

This invention relates to a speed reducer gear box and more particularly to a speed reducer gear box having a flywheel mounted on the input shaft thereof.

Speed reducer gear boxes are frequently used on trenching machines or other types of machines which are severely vibrated or impacted during the operation thereof. If the gear box is being driven by a hydraulic motor, the vibration from the machine is transmitted through the gear box to the hydraulic motor and can cause the hydraulic motor to fail. The sudden impact imposed on the trenching machine by the trencher striking a rock can transmit damaging shock to the hydraulic motor through the gear box.

Therefore, it is a principal object of the invention to provide an improved speed reducer gear box.

A still further object of the invention is to provide a gear box having means thereon for stabilizing the operation thereof.

A still further object of the invention is to provide a gear box having a flywheel mounted therein for reducing the shock normally transmitted to the hydraulic motor connected thereto.

A still further object of the invention is to provide a gear box which is economical of manufacture and durable in use.

These and other objects will be apparent to those skilled in the art.

DESCRIPTION OF THE DRAWINGS

FIG. 1 is an end view of the gear box of this invention; and

FIG. 2 is an enlarged sectional view seen on lines 2—2 of FIG. 1.

SUMMARY OF THE INVENTION

A speed reducer gear box is disclosed and includes an input shaft rotatably mounted therein which is operated by a hydraulic motor. The input shaft has a gear tooth portion thereon which is in mesh with a helical gear mounted on an intermediate shaft. The intermediate shaft has a gear tooth portion thereon which is in mesh with a helical gear mounted on the output shaft. A flywheel is mounted on the input shaft to smooth out or stabilize the operation of the gear box.

DESCRIPTION OF THE PREFERRED EMBODIMENT

The reference numeral 10 refers generally to the speed reducer gear box of this invention generally comprising input and output cases 12 and 14 secured together by dowel pins 16 and bolts 18. The numeral 20 refers to an input shaft which is rotatably mounted in bearings 22 and 24 and which has a gear tooth portion 26 formed therein. The numeral 28 refers to a flywheel cover which is welded to the input case as illustrated and which has a bearing support housing 30 welded thereto which provides support for the bearing 24. The input end of the shaft 20 is provided with a splined bore 32 which is adapted to receive the output shaft 34 of a hydraulic motor or the like 36 mounted on the cover 28.

Flywheel 38 is mounted on the splined portion 40 of shaft 20 and is maintained thereon by retaining ring 42.

Intermediate shaft 44 is also mounted in the cases and is rotatably mounted in bearings 46 and 48. Bearing cover 50 is secured to the output case 14 by bolts 52 as seen in FIG. 2. Helical gear 54 is welded to shaft 44 and is in mesh with the gear tooth portion 26. Shaft 44 is provided with a gear tooth portion 56.

Output shaft 58 is rotatably mounted in the gear box and is rotatably mounted in bearings 60 and 62. Shaft 58 extends through cover 64 which is secured to the case 14 by bolt 66. The numeral 68 refers to a seal means embracing the shaft 58. Helical gear 70 is mounted on the splined portion 72 of shaft 58 and includes portion 74 which abuts against bearing 60 to maintain the gear 70 in position. Spacer 76 and nut 78 are mounted on the end of shaft 58 outwardly of bearing 62. The numeral 80 refers to a bearing cover secured to the input case by bolts 82.

Rotation of shaft 20 by the hydraulic motor 36 causes gear 54 to be rotated which in turn causes shaft 44 to be rotated. Rotation of shaft 44 causes gear 70 to be rotated which in turn causes the rotation of output shaft 58. The size of the various gears from the input shaft to the output shaft results in the speed of shaft 58 being less than the speed of shaft 20.

The heart of applicant's invention is the flywheel 38 which is mounted on the shaft 20 and rotates therewith. Shaft 20 is rotated at a fairly rapid rate so that flywheel 38 is operated at a high speed. The "stored" energy in the rotating flywheel is controlled by the equation $I = mrw^2$ where I is inertia, m is mass, r is mass radius, and w is the angular velocity. A given size flywheel will store a larger amount of energy when operated at a higher speed. Conversely, for the same amount of stored energy, a flywheel can be made smaller if it can be operated at a higher speed.

In the instant invention, a smaller flywheel can be used on input shaft 20 than if the flywheel were mounted on the output shaft since the output shaft is rotating at a slower speed than the input shaft. Preferably, then, the flywheel 38 should be mounted on the input shaft although it could be mounted on the output shaft.

In operation, the stored energy or the inertia of the rotating flywheel stabilizes or smooths out the operation of the gear box. Vibration or impact imposed on the output shaft is reduced or smoothed out by the flywheel 38 and thereby reduces the vibration or impact furnished to the hydraulic motor. Thus, the life expectancy of the hydraulic motor will be lengthened.

Thus, it can be seen that the invention accomplishes at least all of its stated objectives.

I claim:

1. A speed reducer gear box comprising, a housing means having an input shaft rotatably mounted therein and adapted to be connected to a power source, said input shaft having a toothed gear means thereon, an output shaft rotatably mounted in said housing means and extending therefrom, said output shaft being adapted to be connected to a driven member, an intermediate shaft mounted in said housing means and having a first toothed gear means mounted thereon which is in mesh with said toothed gear means on said input shaft, said intermediate shaft having a second toothed gear means thereon, said output shaft having a toothed gear means mounted thereon which is in mesh with the said second toothed gear means of said intermediate shaft, said toothed gear means on said input, intermediate and output shafts being of relative sizes such that said input shaft is rotated at a higher rate of speed than said intermediate shaft and said intermediate shaft is rotated at a higher rate of speed than said output shaft, a flywheel, means for mounting said flywheel on said input shaft for rotation of said flywheel in unison with said input shaft, said input shaft being adapted for connection to a power source independently of said means for mounting said flywheel on said input shaft, and said housing means comprising an enclosure for said flywheel, said toothed gear means, said intermediate shaft and at least portions of said input and output shafts, said housing including first and second bearing means into which opposite ends of said input shaft are rotatably mounted, said flywheel being mounted on said input shaft at a position between said first and second bearing means, and said housing including third and fourth bearing means into which opposite ends of said intermediate shaft are rotatably mounted and means for supporting said third and fourth bearing means on the same side of said flywheel and in radially overlapping relation thereto.

2. The gear box of claim 1 wherein said input shaft has a splined bore in one end thereof for connection to a power source, said means for operatively connecting said flywheel to one of said shafts including an external splined portion of said input shaft, said external splined portion being situated in axially overlapping relation to said splined bore.

3. The gear box of claim 1 wherein said toothed gear means on said intermediate and output shafts are situated radially outwardly from said input shaft and axially within the axial extent of said input shaft.

* * * * *